(12) United States Patent
Fields

(10) Patent No.: US 11,844,351 B2
(45) Date of Patent: Dec. 19, 2023

(54) METHOD OF TREATING A GLAZED CERAMIC ARTICLE

(71) Applicant: Microban Products Company, Huntersville, NC (US)

(72) Inventor: Nathan Lee Fields, Concord, NC (US)

(73) Assignee: MICROBAN PRODUCTS COMPANY, Huntersville, NC (US)

( * ) Notice: Subject to any disclaimer, the term of this patent is extended or adjusted under 35 U.S.C. 154(b) by 0 days.

(21) Appl. No.: 15/338,790

(22) Filed: Oct. 31, 2016

(65) Prior Publication Data

US 2018/0116226 A1 May 3, 2018

(51) Int. Cl.
| | |
|---|---|
| A01N 59/16 | (2006.01) |
| A01N 25/08 | (2006.01) |
| C03C 8/18 | (2006.01) |
| C03C 8/04 | (2006.01) |

(52) U.S. Cl.
CPC ............. *A01N 59/16* (2013.01); *A01N 25/08* (2013.01); *C03C 8/04* (2013.01); *C03C 8/18* (2013.01); *C03C 2204/02* (2013.01)

(58) Field of Classification Search
CPC ...................................................... A01N 59/16
See application file for complete search history.

(56) References Cited

U.S. PATENT DOCUMENTS

| | | | |
|---|---|---|---|
| 5,252,521 A * | 10/1993 | Roberts | C03C 8/04 501/17 |
| 5,304,516 A | 4/1994 | Clifford | |
| 5,348,797 A | 9/1994 | Clough et al. | |
| 5,350,718 A * | 9/1994 | Anquetil | C03C 8/02 428/434 |
| 5,597,644 A | 1/1997 | Araki et al. | |
| 5,807,641 A | 9/1998 | Oku et al. | |
| 5,853,866 A | 12/1998 | Watanabe et al. | |
| 5,882,808 A | 3/1999 | Oku et al. | |
| 6,043,171 A | 3/2000 | Siebers et al. | |
| 6,143,318 A | 11/2000 | Gilchrist et al. | |
| 6,303,183 B1 | 10/2001 | Wilczynski et al. | |
| 6,368,668 B1 | 4/2002 | Kobayashi et al. | |
| 6,383,646 B1 | 5/2002 | Tomioka et al. | |
| 6,514,622 B1 | 2/2003 | Hayakawa et al. | |
| 6,756,060 B1 | 6/2004 | Greenspan et al. | |
| 6,887,812 B2 | 5/2005 | Nenasheva et al. | |
| 7,250,178 B2 | 7/2007 | Olsson et al. | |
| 7,476,698 B2 | 1/2009 | Wagoner et al. | |
| 7,488,442 B2 | 2/2009 | Matsumoto et al. | |
| 9,434,638 B2 | 9/2016 | Campbell, Jr. | |
| 9,446,980 B2 | 9/2016 | Campbell, Jr. | |
| 9,446,981 B2 | 9/2016 | Campbell, Jr. | |
| 9,758,428 B1 | 9/2017 | Zhang et al. | |
| 2003/0134107 A1 | 7/2003 | Machida et al. | |
| 2004/0103823 A1 | 6/2004 | Kurihara et al. | |
| 2005/0031703 A1 | 2/2005 | Beier et al. | |
| 2005/0035500 A1 | 2/2005 | Matsumoto et al. | |
| 2005/0106336 A1 | 5/2005 | Ong et al. | |
| 2005/0158400 A1 | 7/2005 | Olsson et al. | |
| 2005/0196430 A1 | 9/2005 | Olsson et al. | |
| 2005/0249791 A1 | 11/2005 | Hobbs et al. | |
| 2005/0252410 A1 | 11/2005 | Bujard et al. | |
| 2006/0048676 A1 | 3/2006 | Bujard | |
| 2006/0141015 A1 | 6/2006 | Tessier et al. | |
| 2007/0110824 A1 | 5/2007 | Nageswaran | |
| 2007/0275168 A1 | 11/2007 | Prochazka | |
| 2008/0085326 A1 | 4/2008 | Ruan | |
| 2009/0104459 A1 | 4/2009 | Campbell, Jr. | |
| 2009/0117173 A1 | 5/2009 | Chen et al. | |
| 2010/0204411 A1 | 8/2010 | Erneta et al. | |
| 2012/0237686 A1 | 9/2012 | Chen et al. | |
| 2013/0302440 A1 | 11/2013 | King et al. | |
| 2014/0212361 A1 | 7/2014 | Ijaz et al. | |
| 2014/0220153 A1 | 8/2014 | Pagotto Simões et al. | |
| 2014/0271757 A1 | 9/2014 | Agrawal et al. | |
| 2014/0356406 A1 | 12/2014 | Patil et al. | |
| 2015/0030696 A1 | 1/2015 | Campbell, Jr. | |
| 2015/0030861 A1 | 1/2015 | Campbell, Jr. | |
| 2015/0030863 A1 | 1/2015 | Campbell, Jr. | |

(Continued)

FOREIGN PATENT DOCUMENTS

| | | |
|---|---|---|
| CA | 2279785 A1 | 2/2000 |
| CN | 1615698 A | 5/2005 |

(Continued)

OTHER PUBLICATIONS

International Search Report and Written Opinion of corresponding International Application No. PCT/US2017/058312; dated Dec. 26, 2017; all enclosed pages cited.
International Search Report and Written Opinion of corresponding application PCT/US2015/064634, dated Feb. 16, 2016, all enclosed pages cited.
PCT/US2008/054190; Form PCT/ISA/237; Written Opinion; dated Jun. 30, 2008; all enclosed pages cited.
PCT/US2008/054190; Form PCT/ISA/237; International Search Report; dated Jun. 30, 2008; all enclosed pages cited.
Supplementary Partial European Search Report for corresponding European Application EP 08730070, dated May 15, 2015, all enclosed pages cited.
Supplementary European Search Report for corresponding European Application EP 08730070, dated Oct. 5, 2015, all enclosed pages cited.
Ernest M. Levin, Carl R. Robbins and Howard F. McMurdie, "Phase Diagrams for Ceramists", Compiled at the National Bureau of Standards, Copyright 1964 by The American Ceramic Society, pp. 69 and 120, published in Columbus, Ohio.

(Continued)

*Primary Examiner* — Sarah Alawadi
(74) *Attorney, Agent, or Firm* — Shumaker, Loop & Kendrick, LLP

(57) ABSTRACT

A method of treating a glazed ceramic article comprises applying an antimicrobial composition on top of an outermost surface of a glazed ceramic article. The antimicrobial composition comprises an antimicrobial additive. The antimicrobial composition further comprises a carrier medium. The antimicrobial additive is selected from the group consisting of $Bi_2O_3$, $ZnO$, $Ag_2CO_3$, $Ag_2O$, Zn, Bi, Ag, and a combination thereof.

18 Claims, 3 Drawing Sheets

(56) References Cited

U.S. PATENT DOCUMENTS

| | | | |
|---|---|---|---|
| 2015/0099095 A1 | 4/2015 | Pershin et al. |
| 2015/0359946 A1 | 12/2015 | Dehnad et al. |
| 2016/0081349 A1 | 3/2016 | Campbell, Jr. |
| 2016/0135470 A1 | 5/2016 | Agrawal et al. |
| 2016/0143291 A1 | 5/2016 | Campbell, Jr. |
| 2017/0231229 A1 | 8/2017 | Meier et al. |

FOREIGN PATENT DOCUMENTS

| | | |
|---|---|---|
| CN | 1843995 A | 10/2006 |
| DE | 19834801 A1 | 2/2000 |
| DE | 202005006784 U1 | 9/2005 |
| EP | 0190504 A2 | 8/1986 |
| JP | H08290985 A | 11/1996 |
| JP | H111380 A | 1/1999 |
| WO | 0014029 A1 | 3/2000 |
| WO | 2004092283 A2 | 10/2004 |
| WO | 2016094484 A1 | 6/2016 |

OTHER PUBLICATIONS

ASTM International Designation: C 347-57 (Reapproved 1983), "Standard Test Method for Reflectance, Reflectivity, and Coefficient of Scatter of White Porcelain Enamels", copyright ASTM International International, Annual Book of Standards, vol. 14.02, published Dec. 1983, pp. 733-735.

Herbert V. Oliveira et al., "Manual of Drying and Firing Porcelain Enamel", PEI-601, Version 1.2, published by the Porcelain Enamel Institute, Nashville, Tennessee, copyright 1996-1997, pp. 1-22.

Japanese Minister of International Trade and Industry and the Japanese Industrial Standards Committee, "Antimicrobial products-Test for antimicrobial activity and efficacy", Standardiztion Journal translated and published by the Japanese Standards Association, Reference No. JIS Z 2801 : 2000(E), published Dec. 20, 2000, Tokyo, Japan, pp. 1-11.

AATCC Committee RA31, "AATCC Test Method 100-1999, Antibacterial Finishes on Textile Materials: Assesment of", AATCC Technical Manual/2003, pp. 149-151.

Richard A. Eppler with Mimi Obstler, "Understanding Glazes", published by The American Ceramic Society, Westerville, Ohio, 2005, pp. 246, 247, 315.

ASTM International Designation: C286, "Standard Terminology Relating to Porcelain Enamel and Ceramic-Metal Systems", copyright ASTM International 1999 (Reapproved 2009) published Jan. 2010, West Conhohocken, PA, pp. 1 and 4.

The Edward Orton Jr. Ceramic Foundation, "Temperature Equivalent Chart for Orton Pyrometric Cones ( C)", www.ortonceramic.com, 2011.

Enamel; 9th Edition of Encyclopedia Britannica—free 9th Edition online Encyclopedia Britannica; vol. 8; all pages enclosed cited.

United States Patent and Trademark Office; Translation of "Antibacterial Enamel And Its Preparation Method" by Wenzhan Ding; Chinese Patent Application No. 1843995; translated Dec. 2012; Phoenix Translations; Elgin, Texas; all enclosed pages cited.

Office Action for corresponding Brazilian Patent Application No. PI0807590-5 dated Jan. 2, 2018, all enclosed pages cited.

\* cited by examiner

METHOD OF TREATING A GLAZED CERAMIC ARTICLE

FIELD OF THE INVENTION

The present invention relates to ceramics, more particularly to a method for treating a glazed ceramic article with an antimicrobial.

BACKGROUND OF THE INVENTION

It is known to add minerals to a ceramic glaze to produce a glaze with antimicrobial properties. Minerals having an antimicrobial effect are mixed with the glaze prior to application on a ceramic body and then fired to become a permanent part of the ceramic surface.

However, adding minerals having an antimicrobial effect to the ceramic glaze often causes defects and alters texture, color, and other properties. Any and all inorganic minerals added to a ceramic glaze prior to firing will have some effect on the final properties of the glaze. Minerals that will impart antimicrobial effect often negatively impact desired color and texture properties of the glaze. The properties most often affected are color, texture, and slip resistance (i.e. surface roughness).

For example, the zinc level in a glaze affects an antimicrobial addition. Zinc fluxes, which causes more melting, in high temperature glazes. There are also interactions with pigments which often affects color.

Also, since many antimicrobial additives are expensive minerals, combining these into a relatively thick glaze layer adds significant cost. Furthermore, much of the minerals having an antimicrobial effect are lost in the depth of the glaze where it cannot affect any bacteria on the surface.

Thus, there is a need for an alternative method that overcomes the disadvantages associated with known methods.

SUMMARY OF THE INVENTION

The invention provides a method for surface application of minerals having an antimicrobial effect on glazed ceramics.

In an embodiment of the invention, a method of treating a glazed ceramic article with an antimicrobial is provided. The method comprises applying an antimicrobial composition on top of an outermost surface of a glazed ceramic article, wherein the antimicrobial composition comprises an antimicrobial additive.

In an embodiment of the invention, a treated glazed ceramic article is provided. The treated glazed ceramic article comprises a glazed ceramic article having an outermost surface, and an antimicrobial composition on top of the outermost surface of the glazed ceramic article. The antimicrobial composition comprises an antimicrobial additive, preferably selected from the group consisting of $Bi_2O_3$, $ZnO$, $Ag_2CO_3$, $Ag_2O$, $Zn$, $Bi$, $Ag$, and a combination thereof.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DESCRIPTION OF THE PREFERRED EMBODIMENTS

Figure 1:
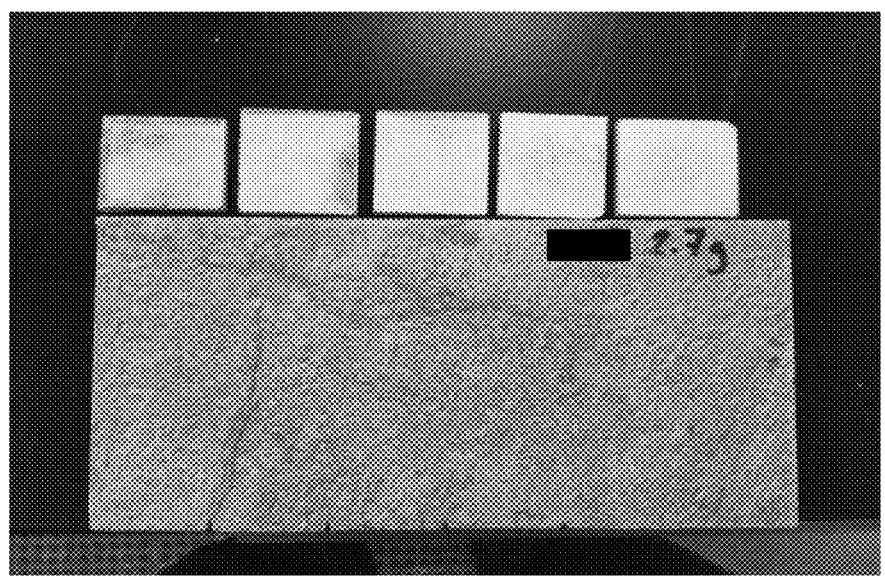
FIG. 1 is a photograph illustrating a decorated porcelain tile with an antimicrobial additive package according to the Examples.

The following description of the embodiments of the present invention is merely exemplary in nature and is in no way intended to limit the invention, its application, or uses. The present invention has broad potential application and utility, which is contemplated to be adaptable across a wide range of industries. The following description is provided herein solely by way of example for purposes of providing an enabling disclosure of the invention, but does not limit the scope or substance of the invention.

As used herein, the terms "microbe" or "microbial" should be interpreted to refer to any of the microscopic organisms studied by microbiologists or found in the use environment of a ceramic article or ceramic-glazed article. Such organisms include, but are not limited to, bacteria and fungi as well as other single-celled organisms such as mold, mildew and algae. Viral particles and other infectious agents are also included in the term microbe.

As well, "antimicrobial" and like terms should be interpreted as encompassing both microbe-killing as well as microbistatic activities. That is, it herein is considered efficacious if an antimicrobial composition reduces the number of microbes on a substrate or it the composition retards the normal rate of microbial growth.

For ease of discussion, this description uses the terms microbes and antimicrobial to denote a broad spectrum activity (e.g. against bacteria and fungi). When speaking of efficacy against a particular microorganism or taxonomic rank, the more focused term will be used (e.g. antifungal to denote efficacy against fungal growth in particular).

Using the above example, it should be understood that efficacy against fungi does not in any way preclude the possibility that the same antimicrobial composition demonstrates efficacy against another class.

For example, discussion of the strong bacterial efficacy demonstrated by a disclosed embodiment should not be read to exclude the embodiment from also demonstrating antifungal activity. This method of presentation should not be interpreted as limiting the scope of the invention in any way.

In an embodiment of the present invention, the method comprises applying an antimicrobial composition comprising an antimicrobial additive or package of antimicrobial additives on top of the outermost surface of a glaze on a ceramic piece before the ceramic piece is fired. During firing, the minerals in the antimicrobial package migrate into the upper layer of the glaze and become permanently combined with the glaze. The method results in an antimicrobial additive package diffusing into the body of the glaze. The highest concentration is at the surface. The concentration diminishes through the depth of the glaze.

In an embodiment of the invention, the antimicrobial additive package diffuses into the body of the glaze according to Fick's Second Law of Diffusion, where the concentration and depth of the migration is proportional to the firing time at high temperature.

Fick's Second Law of Diffusion is:

$$\frac{\partial C}{\partial t} = \chi \frac{\partial^2 C}{\partial x^2}$$

in which the accumulation, dC/dt [cm$^{-3}$ s$^{-1}$], is proportional to the diffusivity [cm$^2$/s] and the 2nd derivative (or curvature) of the concentration, [cm$^{-3}$ cm$^{-2}$] or [cm$^{-5}$].

The highest concentration still remains at the surface of the glaze, where it is most efficacious against bacteria.

In an embodiment of the invention, the antimicrobial additive includes, but is not limited to, one or more of the following: $Bi_2O_3$, $ZnO$, $Ag_2CO_3$, $Ag_2O$, or a frit comprising one or more of Zn, Bi, and Ag. As used herein, "fritting" means melting an antimicrobial agent(s) or constituent(s) into a glass, quenching the glass to freeze the amorphous condition, and then grinding to a desired particle size. A fritted antimicrobial composition is a more homogeneous composition and allows higher amounts of the components than is acceptable in the oxide form.

In an embodiment of the invention, the antimicrobial additive is a combination of 30 to 70 weight % ZnO, 30 to 70 weight % $Bi_2O_3$, and 0 to 10 weight % frit containing Ag.

The application level of antimicrobial additive on the glazed ceramic article is preferably 0.5 g/m$^2$ to 5.0 g/m$^2$, more preferably 1.0 g/m$^2$ to 3.0 g/m$^2$. The materials used are chosen based on the glaze chemistry and glaze type. Glaze chemistry is largely determined by firing temperature and product type. For example, glossy glazes use different chemistry than matte. For example, porcelain glazes use different chemistry than monoporosa, or "ceramic" tile with a porous body. Glaze type generally refers to glossy or matte, wall tile, floor tile, sanitary ware, etc. Different products require specific fired properties, such as strength, hardness, gloss, scratch resistance, and slip resistance.

In an embodiment of the invention, the antimicrobial material is applied in the same manner as glazes. Examples of application methods for use in the invention include, but are not limited to, spray, rotocolor (silicon roller), disc cabin, inkjet, or other printing method.

The antimicrobial material can be mixed with a carrier medium to form an antimicrobial composition that allows for ease of application. Examples of carrier mediums include, but are not limited to, water, polyethylene glycol, and a combination thereof. The choice of carrier medium is not critical to the fired effect as it dries or burns off. The antimicrobial composition of the invention typically has a lower ratio of solids to liquid than a glaze. In an embodiment of the invention, the antimicrobial additive is present in the antimicrobial composition in a ratio of solids to carrier medium in a range of 1% to 10%.

The amount of antimicrobial additive present in the antimicrobial composition varies by the application method. For example, if spraying tends to apply about +/−100 g/m$^2$, which is the total wet application of what is sprayed (as dictated by the limits of the equipment), in order to get a 2 g/m$^2$ dry weight application of antimicrobial additive then 2% is the percent solids in the composition to be sprayed.

For example, if rotocolor tends to apply about +/−30 g/m$^2$, then 6% to 7% is the percent solids in the composition to be sprayed in order to obtain about a 2 g/m$^2$ dry weight application of antimicrobial additive. For example, if a typical spray booth or disc cabin applies +/−100 g/m$^2$ total weight of wet antimicrobial composition, then in order to obtain a 2.5 g/m$^2$ dry weight application of antimicrobial additive, an antimicrobial composition is prepared at 2.5% ratio of solids to carrier medium.

In an embodiment of the invention, the method comprises applying a layer of an antimicrobial composition comprising an antimicrobial additive package(s) and a carrier medium to the surface of the ceramic glaze of a ceramic piece.

In an embodiment of the invention, the antimicrobial composition is applied on top when the glaze layer is thick so as to minimize the amount of antimicrobial. Glazes applied typically range from 15 g/m$^2$ to 1500 g/m$^2$ in thickness, although thickness may vary.

The antimicrobial composition can be applied in a layer of any thickness. However, preferably the antimicrobial composition is applied in a layer having a thickness in a range of 0.5 g/m$^2$ to 5.0 g/m$^2$.

The method further comprises firing the surface of the ceramic glaze having the antimicrobial composition applied thereon. Once fired, this layer becomes a permanent part of the ceramic glaze surface but with a higher concentration of antimicrobial minerals at the surface than throughout the glaze layer, where it is useful to resist bacterial growth. By applying the antimicrobial minerals in accordance with the method of the invention, fewer antimicrobial minerals are used which imparts less impact on the aesthetic and functional properties of the glaze, while still achieving similar or better antimicrobial efficacy.

Thus, the method of the invention overcomes the problem of applying antimicrobial minerals onto a glazed ceramic surface without creating substantial detrimental impact to the normal aesthetic and functional properties of the glaze.

An advantage of the method of the present invention is that it is less expensive and less wasteful, but no less effective, then having high value antimicrobial minerals throughout a glaze layer, where most of it is ineffective as only the top few microns of the glaze surface can interact with bacteria. The method of the invention reduces or eliminates such defects.

Another advantage is that the method of the invention allows for more versatility in production, since the same antimicrobial mixture can be used on multiple glazes, or not at all, without changing the other materials being used.

Example 1

Antimicrobial efficacy data showed that efficacy is as good as or better with the application method of the invention than when antimicrobial treatment was added in the glaze. Formulation A was 33% ZnO, 66% $Bi_2O_3$, and 1% frit containing Ag.

TABLE 1

| Sample ID | Concentration of AM (grams/square meter) | Avg LR v. E. Coli | Percent (%) Reduction |
|---|---|---|---|
| Formulation A in porcelain tile glaze, 7%* | 5.2 | 4.0 | 99.9% |
| Formulation A applied on top, porcelain tile glaze** | 2.2 | 3.9 | 99.9% |

*7% is the addition of antimicrobial to the total dry weight of glaze. In this case, the dry glaze applied was 135 g/m$^2$.
**When applied on top, there was no percentage other than the ratio to water for application purposes. The ratio of antimicrobial to water in this example was 3 weight % antimicrobial to water, as needed, based on the application rate possible in the spray booth.

Additionally, in this case, the additive of Formulation A caused the texture of the glazed porcelain tile to be smoother than desired, decreasing the slip resistance. By applying the antimicrobial on top of the glaze, the amount of antimicrobial additive was be reduced by 57.6% without a reduction in efficacy.

To demonstrate that the antimicrobial did migrate into the glaze layer during firing, two sample sets made at a porcelain tile factory were tested by removing the surface of the tile via polishing with a high speed, diamond surface polishing wheel. 0.05 mm of depth was removed from the surface of each tile sample.

These tile were then scanned with the XRF, and tested for antibacterial efficacy using ASTM E3031-15 test protocol that used on all ceramic tile. The results of those tests were as follows:

TABLE 2

| Tile Type | Avg Log reduction (LR) v. E. Coli | Result |
| --- | --- | --- |
| Decorated Porcelain Tile and Formulation B | 4.7* | 99.9% reduction |

*Greater than 1.0 is considered statistically significant.

These results show that the tile treated in accordance with the invention with Formulation B showed excellent antimicrobial efficacy with 0.05 mm of surface removed. Formulation B was 66% ZnO, 33% $Bi_2O_3$, and 1% frit containing silver. In fact, at this depth the decorative printing had been removed.

XRF Data is as follows:

TABLE 3

| Tile Type | Total Avg AM at 0 mm | Total Avg AM at 0.5 mm |
| --- | --- | --- |
| Decorated Porcelain Tile and Formulation B | 4.980 | 2.956 |

As these numbers show, the total amount of antimicrobial (AM) additive measured by XRF decreased; however, it was still present and effective in the glaze at the depth of 0.05 mm.

It has been determined from testing the antimicrobial treated tile glazes that an antimicrobial formulation when applied to the surface of the glaze and fired onto the tile, diffused into the mass of the glaze. This diffusion followed Fick's Second Law of Diffusion, where the depth of penetration was a function of the time at high temperature during firing. XRF data from this test and other similar tests confirmed this assessment.

FIG. 1 is a photograph of "Decorated Porcelain Tile and Formulation B" tiles. Above the large tile are the pieces which were abraded, to the point that the decoration was largely removed. The photograph of FIG. 1 illustrated that tile made with a base glaze and decorative glaze and an antimicrobial layer showed efficacy even after the decorative glaze layer was removed, demonstrating that the antimicrobial migrated during firing.

Figure 2:
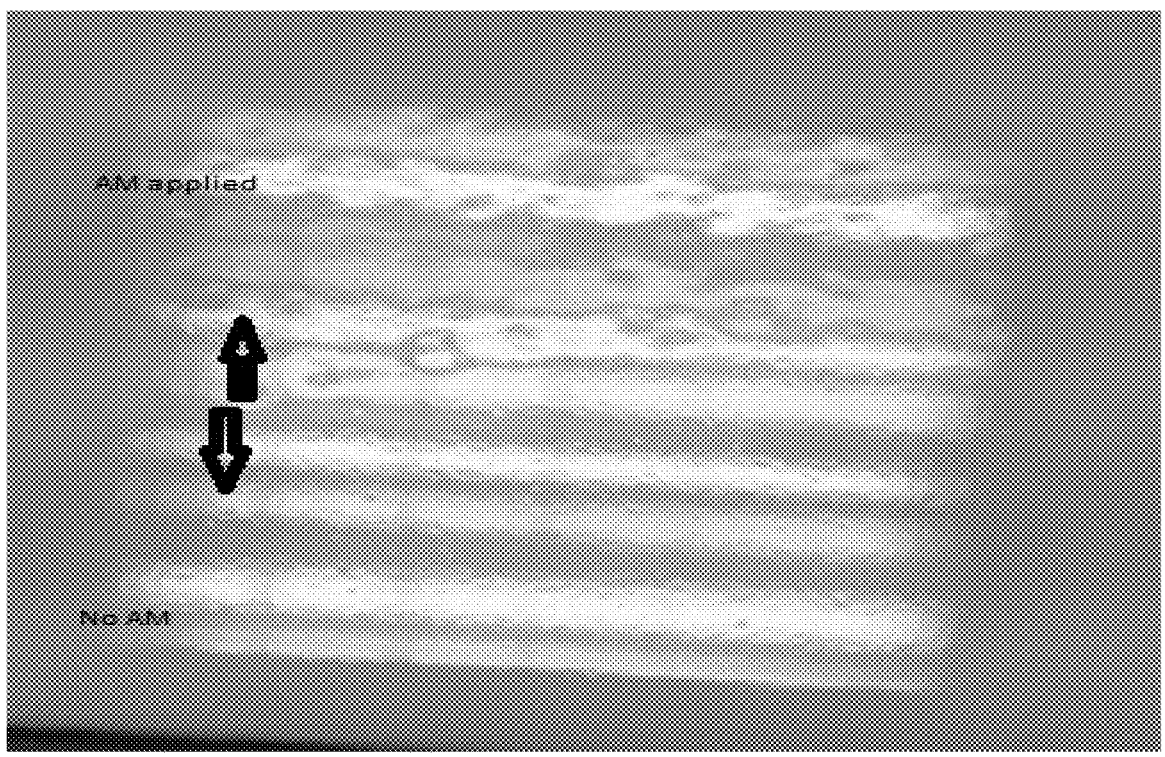
FIG. 2 is a photograph illustrating the effect on glaze texture according to the Examples.

FIG. 2 is a photograph illustrating an example of the effect on glaze texture with Formulation B.

Figure 3:
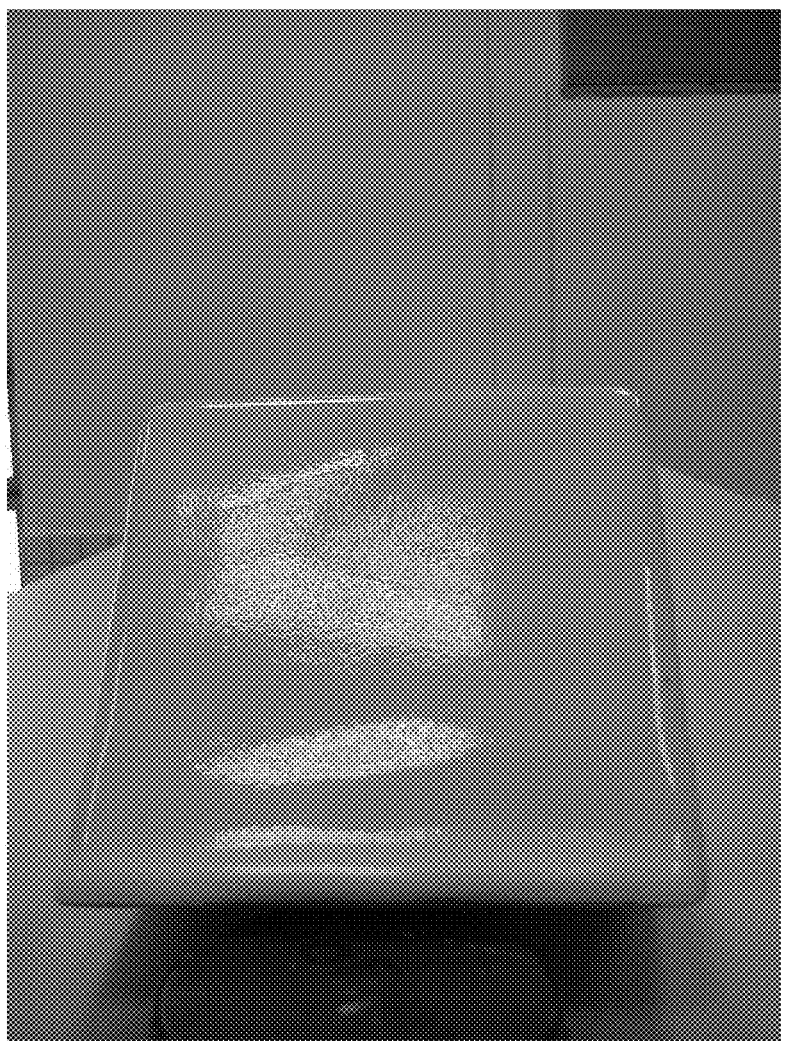
FIG. 3 is another photograph illustrating the effect on glaze texture according to the Examples.

FIG. 3 is another photograph illustrating an example of the effect on glaze texture with Formulation B.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A method of treating a glazed ceramic article, the method comprising:
    applying an antimicrobial. composition on top of an outermost surface of a glazed ceramic article, wherein the antimicrobial composition comprises an antimicrobial additive, wherein the antimicrobial additive is a combination of 30 to 69 weight % ZnO, 30 to 69 weight % $Bi_2O_3$, and 1 to 10 weight % frit containing Ag, and
    firing the glazed ceramic article having the antimicrobial composition applied thereon, wherein the application level of the antimicrobial additive on the glazed ceramic article is in a range of 0.5 $g/m^2$ to 5.0 $g/m^2$.

2. The method according to claim 1, wherein the antimicrobial composition further comprises a carrier medium.

3. The method according to claim 2, wherein the carrier medium is selected from the group consisting of water, polyethylene glycol, and a combination thereof.

4. The method according to claim 1, wherein the antimicrobial additive is a combination of 33 weight % ZnO, 66 weight % $B_2O_3$, and 1 weight % frit containing Ag.

5. The method according to claim 1. wherein the antimicrobial additive is a combination of 66 weight % ZnO, 33 weight % $Bi_2O_3$, and 1 weight % frit containing silver.

6. The method according to claim 1, wherein the antimicrobial additive is present in the antimicrobial composition in a ratio of solids to carrier medium in a range of 1% to 10%.

7. The method according to claim 1, wherein the application level of the antimicrobial additive on the glazed ceramic article is in a range of 1.0 $g/m^2$ to 3.0 $g/m^2$.

8. The method according to claim 1. wherein the antimicrobial composition is applied in a layer.

9. The method according to claim 1, wherein the application occurs by spray, rotocolor, silicon roller, disc cabin, or inkjet.

10. The method according to claim 1, wherein the applied antimicrobial diffuses into the body of the glaze.

11. The method according to claim 10, wherein diffusion occurs according to Fick's Second Law of Diffusion.

12. A method of treating a glazed porcelain tile, the method comprising:
    applying an antimicrobial composition on top of an outermost surface of a glazed porcelain tile, wherein the antimicrobial composition comprises an antimicrobial additive, wherein the antimicrobial additive is a combination of 33 weight % ZnO, 66 weight % $Bi_2O_3$, and 1 weight % frit containing Ag, and
    firing the glazed porcelain tile having the antimicrobial composition applied thereon.

13. The method according to claim 12, wherein the antimicrobial composition further comprises a carrier medium.

14. The method according to claim 13, wherein thecarrier medium is selected from the group consisting of water, polyethylene glycol, and a combination thereof.

15. The method according to claim 12, wherein the antimicrobial additive is present in the antimicrobial composition in a ratio of solids to carrier medium in a range of 1% to 10%.

16. The method according to claim 12, wherein an application level of antimicrobial additive on the glazed porcelain tile is in a range of 0.5 g/m$^2$ to 5.0 g/m$^2$.

17. The method according to claim 16, wherein the application level of the antimicrobial additive on the glazed porcelain tile is in a range of 1.0 g/m$^2$ to 3.0 g/m$^2$.

18. The method of claim 1, wherein the antimicrobial additive is a combination of 33 weight % ZnO, 66 weight % $Bi_2O_3$, and 1 weight % frit containing Ag.

* * * * *